United States Patent [19]

Brookins

[11] Patent Number: 4,908,179
[45] Date of Patent: Mar. 13, 1990

[54] REINFORCED INFLATABLE SEAL

[75] Inventor: Robert H. Brookins, Somers, Conn.

[73] Assignee: Combustion Engineering, Inc., Windsor, Conn.

[21] Appl. No.: 749,069

[22] Filed: Jun. 26, 1985

[51] Int. Cl.$^4$ ............................................. F16J 15/46
[52] U.S. Cl. ..................................... 376/203; 277/34.3
[58] Field of Search ................ 376/203, 205; 277/34, 277/34.3, 34.6, 179; 92/241, 254

[56] References Cited

U.S. PATENT DOCUMENTS

| | | | |
|---|---|---|---|
| 2,189,349 | 2/1940 | Miller | 92/254 |
| 3,106,406 | 10/1963 | Liebig | 277/179 |
| 3,117,796 | 1/1964 | Liebig | 277/179 |
| 3,180,650 | 4/1965 | Liebig | 277/179 |
| 3,633,784 | 1/1972 | Taft | 376/205 |
| 3,812,008 | 5/1974 | Fryer | 376/205 |
| 4,070,221 | 1/1978 | Anthony | 376/205 |
| 4,170,517 | 10/1979 | Meuschke et al. | 376/205 |
| 4,214,760 | 7/1980 | Godfrey | 277/34.3 |
| 4,753,768 | 6/1988 | Puri | 376/205 |
| 4,758,402 | 7/1988 | Schukei et al. | 376/205 |

Primary Examiner—Charles T. Jordan
Assistant Examiner—Richard W. Wendtland
Attorney, Agent, or Firm—John H. Mulholland

[57] ABSTRACT

An arrangement for temporarily sealing the space between two substantially parallel, adjacent plates in which a flexible, partially inflatable seal is located between the plates to effect primary and secondary sealing interfaces along the upper and lower edges of the plates, respectively. The seal has a wedge-shaped upper portion, a tubular lower portion and a substantially solid intermediate shank. The tubular end of the seal is inflated so that it expands into contact with the lower edges of the plates, drawing the wedge-shaped upper portion of the seal toward the tubular portion, thereby forming primary sealing interfaces between the wedged-shaped portion and the upper edges of the plates. The contact of the inflated tubular portion with the lower edges of the plates forms secondary seal interfaces. The effectiveness of the seal can be tested by measuring the pressure in the chambers formed between each set of primary and secondary sealing interfaces. To ensure that the seal can withstand the normal static water head and seismic forces without gross seal failure, metallic stiffening means are embedded within the upper portion of the seal and oriented to extend at right angles to the faces being sealed. This metallic stiffening also ensures that the seal can withstand the effect of a dropped fuel assembly on the seal without gross seal failure.

8 Claims, 2 Drawing Sheets

REINFORCED INFLATABLE SEAL

TECHNICAL FIELD

The present invention relates to sealing the space between adjacent plates or ledges. More particularly, the invention relates to providing a temporary seal for supporting liquid above the plates.

BACKGROUND ART

The conditions giving rise to the problems solved by the present invention are commonly found in nuclear reactor power plants. In particular, the refueling process in pressurized water reactors must be performed under approximately 25 feet of water in a refueling canal above the reactor vessel, while the reactor vessel cavity under the canal must be maintained dry. During normal power operation the refueling canal is dry and, with the vessel cavity, forms a single large enclosure. Usually, the seal between the refueling canal and the vessel cavity cannot be left installed during normal operation, only during refueling.

Typically, a portion of the floor of the refueling canal forms a ledge opposite a flange attached to the upper portion of the reactor vessel. The ledge and flange provide sealing surfaces on which prior art canal sealing interfaces were effected. Prior art seals typically consist of a ring plate having an outside diameter of about 25 feet and a width of from 1 to 3 feet. Compression seals carried on the underside of the ring plate rested on the flange and ledge. The ring plate was bolted down to compress the seals and form a water-tight fit.

Several problems exist with this type seal. First, the lower surface of the plate must be machined during shop fabrication, a costly operation for such a large structure, in order to assure proper compressive sealing throughout the circumference of the plate. This need for a nearly perfectly flat lower surface precludes assembly of the plate in the field, so that a large, cumbersome structure must be shipped from the shop to the site. Further, the plate must arrive on site before the containment building is erected because the plate is too large to pass through the containment penetrations. This results in the plate being kept near its final storage area while the containment building is erected around it, inconveniencing workers who have not yet completed the interior structure in the vicinity of the storage area. Another problem with such prior art seals is that after a few years of plant operation, the flange and ledge tend to shift from the as-built locations due to thermal expansion, building settling, etc. Additional threaded penetrations for the compression bolts must be drilled. This not only delays refueling operations, but adds to the radiation exposure of the work crews who already experience significant radiation during the tightening of the many bolts between the plate and the ledge and flange. A modification to the prior art seal eliminates the compression seals and bolts at the flange surface by substituting an inflatable seal interacting between the outer surface of the flange and a backing ring of the underside of the plate.

Even with these improvements, safety and licensing considerations require the capability to test the seals before water is introduced into the refueling canal. Typically, a separate set of seals is provided adjacent to the primary seals so that the air pressure in the space between the primary and secondary seals can be measured as an indication of the effectiveness of the seals. The separate seals present the same design and fabrication problems as the prior art primary seals.

DISCLOSURE OF THE INVENTION

The present invention contemplates providing a seal which, when located between adjacent walls, provides sealing interfaces and can maintain an adequate seal, under normal water level, without gross seal failure during: (1) plant static and seismic conditions, and (2) postulated dropping of a fuel assembly from the refueling machine directly onto the seal. To accomplish this, the upper seal flange incorporates reinforcing members within the seal body oriented substantially normal the sealing interfaces.

The invention further contemplates providing temporary sealing interfaces between spaced apart, adjacent plates, ledges, or flanges which do not require any carefully machined sealing surfaces.

The invention further contemplates providing a seal plug arrangement for a refueling canal which can be field assembled and which greatly reduces the radiation exposure to workmen installing this seal plug.

The invention further contemplates providing a sealing arrangement comprising a first plate or wall having first and second parallel edges and a second wall in adjacent closely spaced parallel relationship to the first wall and having first and second edges substantially opposite the first and second edges of the first wall. A flexible seal is disposed in the space between the first and second walls, the seal having a flanged upper end. The flanged end is in contact with and extends outwardly beyond the first edges of the first and second walls. Metallic pins are included in the flanged end of the seal and oriented at right angles to the faces or surfaces being contacted by the seal.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Figure 1:
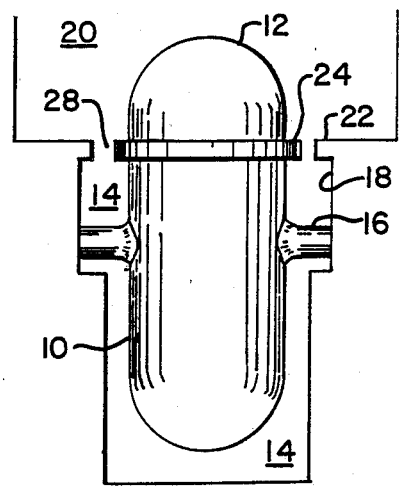
FIG. 1 is an elevation view of the reactor vessel located in the reactor vessel cavity and refueling canal.

FIG. 1 shows the environment in which the preferred embodiment of the invention is used. A reactor vessel 10 having a vessel head 12 is located in a reactor vessel cavity 14 and suspended therein by vessel nozzles 16 which find their support within the cavity walls 18. Above reactor vessel 10, the cavity walls 18 define a refueling canal 20 having a lower boundary defining a refueling canal ledge 22 generally opposite the vessel flange 24 which is welded to vessel 10.

Refueling the reactor generally occurs annually and consists of filling the refueling canal 20 with water, then removing vessel head 12 from vessel 10 so that access may be had to the nuclear fuel (not shown) inside vessel 10. It is imperative, however, that none of the water in the refueling canal 20 leak into vessel cavity 14 because refueling water would create contamination problems with vessel 10 and other equipment in vessel cavity 14. The annular space 28 between the vessel flange 24 and the cavity ledge 22 cannot be sealed during plant operation because of safety and licensing requirements relating to hypothetical accidents which must be accommodated without damage to any components. In particular, if a vessel nozzle 16 breaks, the flashing liquid must have an escape route from the vessel cavity 14 in order to prevent excessive uplift on vessel 10 which could further complicate an already serious accident. Therefore, space 28 must be maintained during normal operation to provide a steam flow path out of the vessel cavity 14. Space 28 may be sealed only during the reactor refueling operation.

Figure 3:
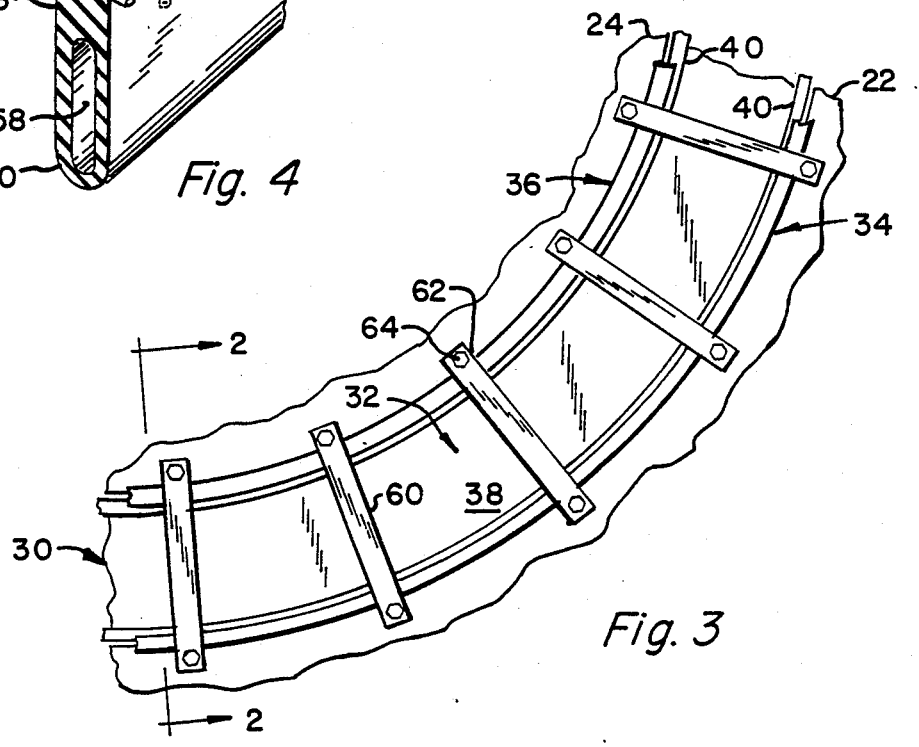
FIG. 3 is a plan view of the invention in place between the reactor vessel flange and the refueling canal ledge.
Figure 2:
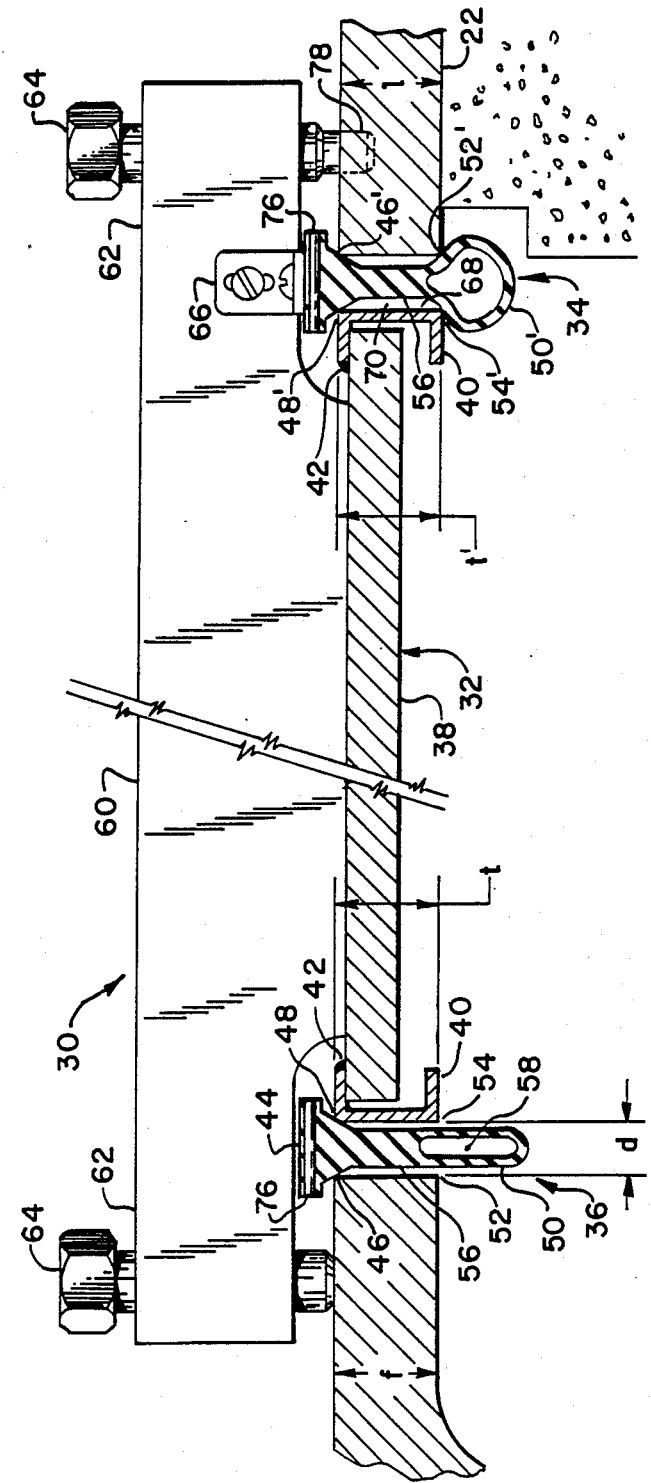
FIG. 2 is a detailed elevation view of the invention as implemented between the reactor vessel flange and the refueling canal ledge, taken a long lines 2—2 of FIG. 3.

FIGS. 2 and 3 show the preferred embodiment of the invention in place between the vessel flange 24 and canal ledge 22. In this embodiment of the invention, a plug 30 having a seal ring 32 is located between flange 24 and ledge 22 and carries ledge seal 34 and flange seal 36. Seal ring 32 typically has an outer diameter of about 25 feet and a width of approximately 1 to 3 feet. It can be appreciated that such a large steel structure is difficult to fabricate to close tolerances and that a great expense will be incurred if one ore more horizontal surfaces of the ring must be carefully machined. As will be described below, the present invention does not require special machining of ring 32. The primary requirement imposed on ring 32 is that the ring effective thicknesses t, t' at the inner and outer edges by substantially equal to the thickness f of the opposing vessel flange and l of the cavity ledge, respectively. In the preferred embodiment, the thickness of a steel ring plate 38 of the seal ring 32 is substantially less than the thickness f and l in order to save on the cost of materials. Plate 38 has C-channels 40 attached to the outer and inner edges, the channels having edges opposing flange 24 and ledge 22 and separated therefrom by a distance d. These channels 40 are welded to plate 38 around its entire inner and outer radii, the weld 42 serving primarily to form a seal between channels 40 and plate 38, rather than supplying great structural strength. Plate 38 and channels 40 together form the seal ring 32 in this embodiment.

Figure 4:
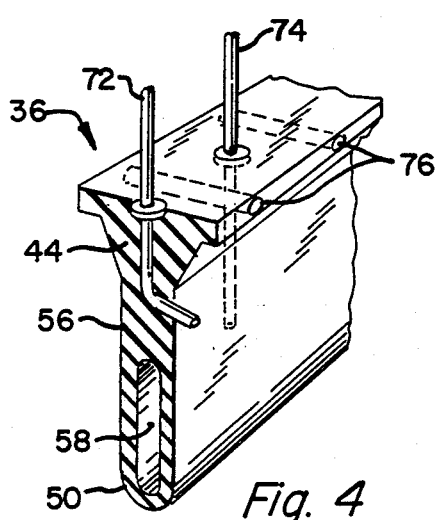
FIG. 4 is a cut-away view of the flexible seal showing the air tap, the test probe, and the metallic stiffening means embodying the present invention.

Referring now to FIGS. 2 and 4, flexible seal 36 between ring 32 and flange 24 is shown in the initial, or relaxed state as it would appear upon insertion of plug 30 between flange 24 and ledge 22. Flexible seal 34 between ring 32 and ledge 22 is identical in this embodiment, but shown in the inflated or sealing state. Seal 36 has an enlarged upper end 44 with a tapered wedge portion 44a which extends above the flange upper edge 46 and ring upper edge 48 for reasons to be explained below. The lower end 50 of seal 36 is tubular and extends below the flange lower edge 52 and ring lower edge 54. Each seal 36 has a substantially solid elongated shank portion 56. This shank 56 permits a geometric center 58, or longitudinal axis, of the tubular portion 50 to be below the imaginary plane formed by connecting the flange lower edge 52 to the ring lower edge 54 without requiring portion 50 to be excessively elongated. In addition, shank 56 also serves as one fairly rigid boundary of a naturally formed chamber used for testing the effectiveness of the seal, as hereinafter explained.

After seal 36 is in place, as shown at left in FIG. 2, tubular portion 50 is inflated until the seal deforms into the configuration shown as seal 34 in FIG. 2. As the seal expands between the configurations shown as the flange seal 36 and ledge 34, the walls of tubular portion 50 come into contact with ring lower edge 54 and flange lower edge 52. As tube 50 continues to expand, a downward force is transmitted through the shank 56 onto the wedge portion 44a, drawing wedge 44a inward toward the space between ring 32 and flange 24. Inflation is stopped when the tube reaches an internal pressure in the range typically between 25 to 100 psi, depending on the dimensions t and d, and the size of the seal. If the geometric center 58 of tubular portion 50 is too close to wedge portion 44a, the drawing-down action of the tube pressing against the lower edges 52 and 54 may be diminished so that a satisfactory sealing interface will not be obtained.

In the preferred embodiment, ledge seal 34 and flange seal 36 are carried on the plug 30 by means of slotted L-brackets 66, shown here only attached to ledge seal 34, but it is to be understood that every seal 34, 36 is likewise attached to a support arm 60. Bracket 66 maintains the seals in a fixed lateral position relative to ring 32 to facilitate installation but permits seal motion transverse to the plate. Such freedom in the transverse direction is necessary to permit wedge portion 44a of the seals to be drawn into the space to be sealed during inflation of the tubular portion 50.

Before the refueling canal 20 can be filled with water, the seal effectiveness must be tested. Inflated seals 34,36 provide convenient test chambers between wedge portion 44a and tubular portion 50. Wedge 44a is a passive seal that provides the primary sealing interface protection against the head of water in the refueling canal. Tubular portion 50 provides a secondary active sealing interface which will continue to function even if a leak occurs in the wedge sealing interface. The primary and secondary sealing interfaces at 48', 54' shank 56 and the channel wall 68 define a test chamber 70 into which a test probe can be introduced. Each inflated seal 34,36 forms two test chambers. In the preferred embodiment, a test probe 72 is carried by the flexible seals, as shown in FIG. 4. Several probes 72 can be located along the length of seals 34,36 alternately facing inward and outward. FIG. 4 also shows the conventional air tap 74 through which air is introduced into the tubular portion 50 of the seal for activating the seal.

Referring again to FIGS. 2 and 3, it can be appreciated that plug 30, as described above, can weigh 10,000 pounds or more and that handling such a structure could pose significant problems to a work crew. In the preferred embodiment of the invention, plug 30 includes several ring supports 60 distributed around ring 32. The ring supports provide members which can be grasped by an overhead crane (not shown) in the containment for positioning plug 30 between flange 24 and ledge 22. As shown in FIG. 2, plate supports 60 are also adapted to aid in positioning and supporting ring 32 with respect to flange 24 and ledge 22 such that edges 46 and 48, 52 and 54, 46' and 48', 52' and 54' are respectively opposite as required for proper sealing. Support arms 62 are cantilevered from ring 32 so as to overhang flange 24 and ledge 22. Leveling bolts 64 are threaded through arm 62 and bear upon the upper surfaces of flange 24 and ledge 22 whereby ring 32 can be vertically oriented with respct thereto. Bolts 64 need not be threaded into flange 24 or ledge 22 since only two holes 78 in ledge 22 are needed to laterally and rotationally orient plug 30 by means of locating pins. Therefore, much installation time is saved relative to the prior art seals, which required careful bolting. The first refueling operation may require several leveling bolt adjustments befor ring 32 is flush with flange 24 and ledge 22, but thereafter only minor adjustments should be necessary. It is a simple matter to check whether ring 32 is in proper position because, as shown in FIG. 3, most of the ring 32 and flexible seals 34,36 are exposed for inspection.

Since plate 38 does not serve as a sealing surface for the flexible seals 34,36, plug 30 may be manufactured in as many segments as desired, and fabricated at the site. Machining on a large boring mill is not required. The plate segments can be butt welded at the site. The tolerances for this butt weld are rather loose and only good fabrication practices are required. The most important dimensions are the inner diameter and outer diameter of the channels 40. By allowing excess plate at the ends of each segment for field trimming, the radii of plate 38 can be controlled without any difficulties.

After the refueling operation has been completed, plug 30 may be removed by simply deflating seals 34,36 and pulling upward on the plug support arm 62 to remove the entire plug assembly, including seals, from the space between flange 24 and ledge 22. It may be appreciated that such a simple removal operation minimizes the exposure of the workmen to radiation and in aprticular does not require the unbolting of plug 30 from flange 24 or ledge 22.

As a result of additional seal interfere requirements whereby, (1) the margin of safety was increased, (2) the seal had to withstand plant seismic considerations without gross seal failure, and (3) the seal had to withstand the effects of a dropped fuel assembly without gross seal failure, it was necessary to incorporate a stiffening structure for upper end 44 of seals 34,36 to prevent distortion of the seals. The present invention is embodied in metallic structure within portion 44 to resist the force of the hydrostatic head. Specifically, the structure is given the preferred form of cylindrical pins 76. As shown in FIG. 4, pins 76 are oriented to extend through seal portion 44 and span the gap from the ledge to the seal ring and from the flange to the seal ring. The pins are made from the proper metal and dimensioned to successfully accomplish the above.

CONCLUSION

Although the claimed structure of Dwaine A. Godfrey, U.S. Pat. No. 4,214,760, issued July 29, 1980, has been demonstrated as incorporating the present invention, it must be appreciated that other seal bodies need not have the specific form disclosed and claimed in the patent and including the present invention. The present invention is embodied in a metallic stiffening structure positioned through that portion of the seal body extending above the surfaces sealed. The stiffening structure has been disclosed as in the form of pins, and are positioned and sized to successfully resist forces received upon the upper surface to the seal body. The seal body may have many different forms to accommodate the surfaces engaged by the seal body; therefore, in its broadest definition, the invention is in metallic stiffening structure extended through that portion of the seal body extending above the sealed surfaces.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiment may be made of the invention without departing from the scope thereof, it is to be understood that all matter herein set forth or shown in the accompanying drawings is to be interpreted in an illustrative and not in a limiting sense.

I claim:

1. An arrangement for sealing a gap between two vertical surfaces to provide resistance to downwardly directed forces which would dislodge a seal body from between the vertical surfaces, including,
    a gap between two parallel vertical surfaces, a flexible seal body in the gap between the parallel vertical surfaces and extending above the surfaces,
    and metallic stiffening structure extending horizontally through the seal body above the parallel surfaces to span the gap and thereby to provide resistance to hydrostatic and seismic and mechanical forces applied downwardly on the seal body.
2. The arrangement of claim 1, in which:
    the metallic stiffening structure extending horizontally through the seal body is in the form of pins.
3. The arrangement of claim 2, in which,
    the vertical surfaces are on a flange of a nuclear reactor vessel and a ledge formed by a wall of a vessel cavity in which the vessel is suspended by its nozzles passing through the wall and the seal body between the surfaces resists displacement by static and seismic and mechanical forces directed downwardly upon the seal body.
4. A sealing arrangement betwen a flange (24) on a nuclear reactor vessel (10) and a ledge (22) formed by the wall (18) of a reactor vessel cavity (14) in which the reactor vessel is suspended by its nozzles (16) passing through the wall, including
    a seal ring (32) having first and second parallel edges (48,54 and 48',54') on its inner and outer radii and positioned in a closely spaced and parallel relationship to first and second parallel edges (46,52) on a vessel flange (24) and first and second parallel edges (46',52') on a ledge (22) of a cavity wall (18),
    a first flexible seal (36) disposed in a space between the first and second parallel edges of the vessel flange and the first and second parallel edges on the inner radius of the seal ring and the flexible seal having an upper end extending up and above the first edges of the vessel flange and the seal ring,
    a second flexible seal (34) identical to the first flexible seal and disposed in a space between the first and second parallel edges of the cavity wall ledge and the first and second parallel edges on the outer radius of the seal ring,
    and the upper end (44) of each flexible seal provided with a metallic stiffening structure therein to span the space between said first and second parallel edges above said edges, thereby to provide resistance to hydrostatic and seismic and mechanical forces applied downward on the seals.
5. The sealing arrangement of claim 4, in which,
    the metallic stiffening structure is in the form of pins (76) extending horizontally through the upper end of the seal.

6. The sealing arrangement of claim 4, in which, the pins are spaced around the circumference of each seal.

7. The sealing arrangement of claim 4 in which each flexible seal includes a tapered wedge at its upper end for sealing with the first and second parallel edges, an elongated solid shank within the space between said first and second parallel edges, and a tubular lower end portion, said shank and tubular lower end portion having a cross-sectional thickness less than the distance between said first and second parallel edges for easy insertion into said space and said tubular lower end portion, upon inflation, having an overall cross-sectional dimension exceeding said distance.

8. The sealing arrangement of claim 7 in which the tubular lower end portion has its geometric center (58) spaced from the wedge portion by a distance such that the drawing-down action of the tubular portion, upon inflation, creates a tensile force in the shank portion and a sealing engagement between the wedge portion and the top edges of the first and second parallel edges and the inflated tubular portion and lower edges of the first and second parallel edges.

* * * * *